Oct. 21, 1952  C. A. ADAMS  2,614,898
BALL BEARING
Filed Dec. 14, 1948

INVENTOR.
C. A. ADAMS
BY
Merrill M. Blackburn
ATTORNEY

Patented Oct. 21, 1952

2,614,898

UNITED STATES PATENT OFFICE 2,614,898

BALL BEARING

Charles A. Adams, Davenport, Iowa

Application December 14, 1948, Serial No. 65,178

2 Claims. (Cl. 308—196)

My present invention relates to bearings and a method of producing same, and pertains, especially, to a permanent type of ball bearing which is not intended to be repaired but to be used as long as serviceable and then discarded, being replaced by a new one. The purpose of this invention is to produce a bearing of the type indicated which will be efficient in operation, easy to assemble, and inexpensive to produce.

In the drawings annexed hereto and forming a part hereof,

Figure 1:
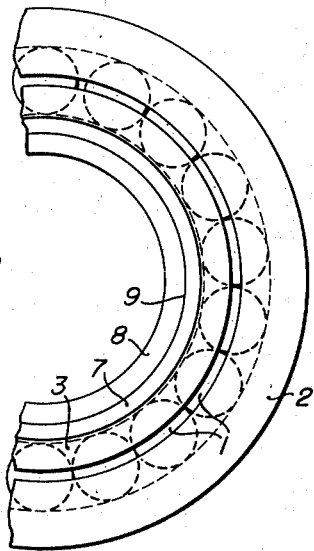
Fig. 1 is a fragmentary elevation of a bearing constructed in accordance with my present invention.
Figure 2:
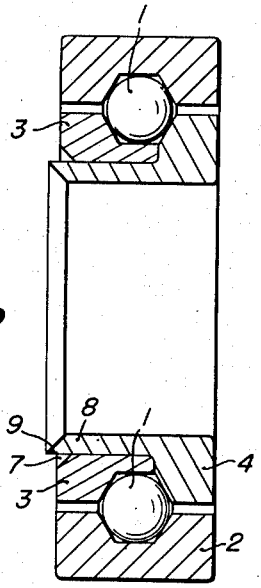
Fig. 2 represents a transverse section through the bearing shown in Fig. 1.
Figure 3:
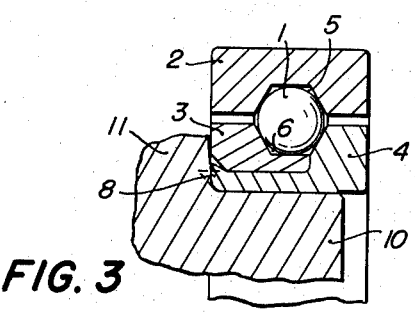
Fig. 3 is a partial transverse section showing the mode of permanently securing the parts of this bearing together.

Reference will now be made in greater detail to the annexed drawings for a more complete description of this invention which comprises a set of balls and three rings, the balls being denoted by the numeral 1 and the rings by the numerals 2, 3, and 4, respectively. Comparable to the rings 2, 3, and 4 of Figs. 1, 2, and 3, are corresponding rings 2a, 3a, and 4a in the structure of Figs. 4 and 5. In the structure of Figs. 1, 2, and 3, the ring 2 is on the outside while, in the structure of Figs. 4 and 5, the ring 2a constitutes the inner ring of the bearing. The ring 2 has a circular channel 5, located in the inner face wall, while the ring 2a has a corresponding channel 5a located in the outer face wall, as shown in Fig. 5. The channels 5 and 5a are semi-hexagonal in cross-section and, therefore, they have three faces against which the balls 1 may bear during the operation of the bearings.

In the structure of Fig. 3, an inner edge of the ring 3 is provided with a channel 6 which provides two faces of the second half of the circular channel for the reception of the balls 1. The third ring 4 has one edge channeled for the reception of the ring 3, and one edge of this channel is chamfered to furnish the sixth face of the circular ball channel, thus completing the channel in which the balls 1 roll during the operation of the bearing. Constructed in this way, the bearing is both a radial bearing and an end thrust bearing, as will be readily apparent from an examination of Fig. 3 of the drawings. Although the channel may be made in the form of an equilateral hexagon, in cross-section, or with longer slopes on the inclined faces of the channels, it is believed that the most efficient form of this construction is that in which the channel is an equilateral hexagon.

In the structure of Fig. 5, the order of the rings is just reversed so that the securing ring 4a is around the outside instead of inside of the first ring. As shown at 7 and 7a, the rings 3 and 3a are chamfered around one edge to produce a recess into which the thin edge portion 8 or 8a may be bent by bending the edge 9 or 9a into the space 7 or 7a whereby to hold the three rings together, with the balls 1 in the circular channel between the rings.

In order to tie the three rings together, a mandrel 10 having a flange 11 and fitting closely within the ring 4 of Figs. 2 and 3 may be forced into the opening through the ring 4 with the result that the thin edge 9 of ring 4 will be forced into the only vacant space available, that is, the space 7, and thus secure the two rings 3 and 4 together. These will be held in place with relation to the ring 2 by the presence of the balls 1 in the ring channel.

Figure 4:
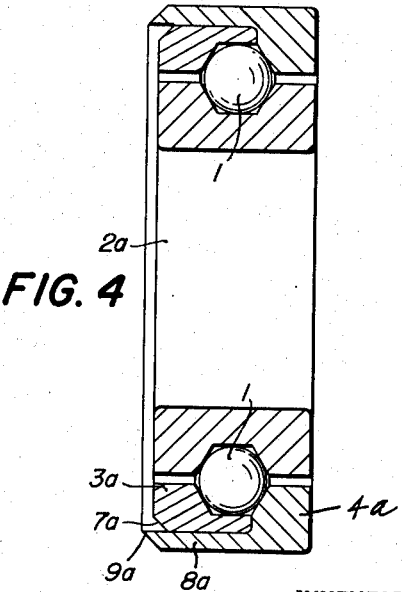
Fig. 4 is a view comparable to Fig. 2 but with the securing ring placed outside of the other rings, rather than inside, as in Fig. 2.
Figure 5:
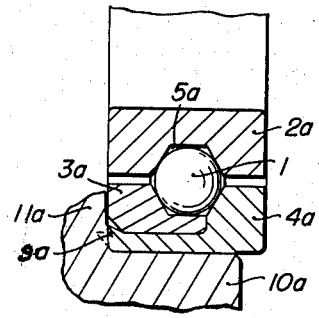
Fig. 5 shows the method of permanently fastening together the parts of the bearing shown in Fig. 4.

In the case of the structure shown in Figs. 4 and 5, the element 10a surrounds the ring 4a, and its flange 11a will cause the thin edge 9a to turn into the space 7a, comparably to what takes place in connection with the structure of Figs. 2 and 3. If it is felt desirable, a ball-spacing ring may occupy the space between the rings to keep the balls in position relatively to each other. This may be necessary in some instances but not in all.

The parts of the three rings contacting the balls 1 are hardened, or case-hardened, to withstand wear, and the thin part 8 or 8a of ring 4 or 4a is softened enough so that it can be bent into the chamfer 7 or 7a whereby to prevent separation of the rings 3 and 4 or 3a and 4a.

It is of course obvious that departures may be made from the disclosure herein without departing from the spirit of this invention or the subject matter as disclosed by the appended claims.

Having now described my invention, I claim:

1. A bearing comprising a bearing ring provided with a channel of semi-hexagonal cross-section having a central cylindrical ball-receiving surface and two angularly related conoidal surfaces, a bearing ring cooperating with the first ring and having a channel in one edge shaped to provide a ball-receiving conoidal surface diametrically opposite one of said two conoidal surfaces and contiguous to the other, said second bearing ring also having an elongated cylindrical surface lying in radially spaced relation with respect to said ball-receiving conoidal surface, the elongated cylindrical surface of said second bearing ring lying substantially directly opposite the central cylindrical surface of the first mentioned bearing ring, said cylindrical surfaces being substantially concentric and spaced apart a distance greater than the distance between said diametrically opposite conoidal surfaces, a third ring cooperating with the first and second rings in forming a ball raceway having a hexagonal cross-section, and balls in said raceway serving as friction-reducing means for the rings, said third ring having a conoidal surface lying, when the bearing is assembled, diametrically opposite said other conoidal surface of said first mentioned bearing ring, and an axially inward portion having a cylindrical ball-receiving surface and, spaced radially therefrom, an elongated cylindrical surface adapted to telescope within and overlap the elongated cylindrical surface of said second bearing ring, the cylindrical ball-receiving surface of said third ring being spaced radially from the cylindrical ball-receiving surface of said first mentioned bearing ring a distance equal to the diameter of one of said balls.

2. In an anti-friction bearing construction, an inner race means, an outer race means, one of said race means having an annular recessed section forming substantially one-half of the total raceway of the bearing, said recessed section having a substantially cylindrical section and two raceway end sections at opposite sides of the cylindrical section, the other race means comprising two telescopically associated ring members, one carried by the other, said telescopically associated ring members overlapping for an appreciable distance centrally of the bearing, said one ring member having a recessed portion shaped to provide a raceway end section, concentric with one of the first mentioned raceway end sections, and a cylindrical section concentric with said first mentioned cylindrical section, the other ring member having a raceway end section concentric with the other of said first mentioned raceway end sections and a cylindrical section having a diameter to telescopically receive said one ring member so that the cylindrical section of said one ring member and the cylindrical section of said other ring member overlap, means acting against said telescopically associated ring members for holding them in associated relation, and antifriction bearing elements confined radially between one of said overlapping cylindrical sections and the cylindrical section of said one race means, whereby radial loads do not stress said holding means or tend to separate said telescopically associated ring members.

CHARLES A. ADAMS.

REFERENCES CITED

The following references are of record in the file of this patent:

UNITED STATES PATENTS

| Number | Name | Date |
| --- | --- | --- |
| 1,093,348 | Mooers | Apr. 14, 1914 |

FOREIGN PATENTS

| Number | Country | Date |
| --- | --- | --- |
| 6,059 | France | Aug. 29, 1906 |
| 669,436 | France | Nov. 15, 1929 |
| 722,489 | Germany | July 10, 1942 |